(12) United States Patent
Diehl et al.

(10) Patent No.: US 10,690,621 B2
(45) Date of Patent: Jun. 23, 2020

(54) SENSOR ELEMENT FOR DETECTING AT LEAST ONE PROPERTY OF A MEASURING GAS IN A MEASURING GAS CHAMBER

(71) Applicant: Robert Bosch GmbH, Stuttgart (DE)

(72) Inventors: Lothar Diehl, Gemmrigheim (DE); Gaetan Deromelaere, Yokohama (JP); Michael Piwonski, Stuttgart (DE); Peter Raffelstetter, Bietigheim-Bissingen (DE); Thilo Lehre, Stuttgart (DE); Thorsten Sahm, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 16/065,171

(22) PCT Filed: Nov. 9, 2016

(86) PCT No.: PCT/EP2016/077172
§ 371 (c)(1),
(2) Date: Jun. 22, 2018

(87) PCT Pub. No.: WO2017/108256
PCT Pub. Date: Jun. 29, 2017

(65) Prior Publication Data
US 2018/0372674 A1 Dec. 27, 2018

(30) Foreign Application Priority Data

Dec. 23, 2015 (DE) .................... 10 2015 226 644

(51) Int. Cl.
| | | |
|---|---|---|
| *G01N 27/407* | (2006.01) | |
| *G01N 27/403* | (2006.01) | |
| *G01N 27/30* | (2006.01) | |

(52) U.S. Cl.
CPC ......... *G01N 27/4071* (2013.01); *G01N 27/30* (2013.01); *G01N 27/403* (2013.01)

(58) Field of Classification Search
CPC ... G01N 27/4071; G01N 27/30; G01N 27/403
See application file for complete search history.

(56) References Cited

U.S. PATENT DOCUMENTS

| | | | |
|---|---|---|---|
| 4,797,194 A | 1/1989 | Mase et al. | |
| 6,311,543 B1 * | 11/2001 | Yoshikawa | ........ G01N 27/4071 73/23.2 |

(Continued)

FOREIGN PATENT DOCUMENTS

| | | |
|---|---|---|
| DE | 102006034365 A1 | 2/2007 |
| DE | 102007049715 A1 | 7/2008 |
| DE | 102013212370 A1 | 12/2014 |

OTHER PUBLICATIONS

International Search Report dated Feb. 1, 2017 of the corresponding International Application PCT/EP2016/077172 filed Nov. 9, 2016.

(Continued)

*Primary Examiner* — Luan V Van
*Assistant Examiner* — Caitlyn Mingyun Sun
(74) *Attorney, Agent, or Firm* — Norton Rose Fulbright US LLP; Gerard Messina

(57) ABSTRACT

A sensor element for detecting at least one property of a measuring gas in a measuring gas chamber, in particular for detecting a proportion of a gas component in the measuring gas or a temperature of the measuring gas, includes a ceramic layer construction that includes at least one electrochemical cell, the electrochemical cell having at least one first electrode, a second electrode, and at least one solid electrolyte connecting the first electrode and the second electrode. The second electrode is situated in the layer construction facing an electrode cavity that is in the layer (Continued)

construction. The second electrode has at least one outer diameter that is greater than a corresponding outer diameter of the electrode cavity.

10 Claims, 2 Drawing Sheets

(56) References Cited

U.S. PATENT DOCUMENTS

| | | | | |
|---|---|---|---|---|
| 2002/0070736 A1* | 6/2002 | Nakae | ................ | G01N 27/407 324/717 |
| 2005/0034986 A1* | 2/2005 | Scheer | ............... | G01N 27/4075 204/426 |
| 2011/0206813 A1* | 8/2011 | Shen | ...................... | G01N 33/02 426/231 |

OTHER PUBLICATIONS

Konrad Reif (Ed.): Sensoren im Kraftfahrzeug (Sensors in the Motor Vehicle), 1st Edition 2010, p. 160-165.

* cited by examiner

SENSOR ELEMENT FOR DETECTING AT LEAST ONE PROPERTY OF A MEASURING GAS IN A MEASURING GAS CHAMBER

CROSS-REFERENCE TO RELATED APPLICATIONS

The present application is the national stage of International Pat. App. No. PCT/EP2016/077172 filed Nov. 9, 2016, and claims priority under 35 U.S.C. § 119 to DE 10 2015 226 644.3, filed in the Federal Republic of Germany on Dec. 23, 2015, the content of each of which are incorporated herein by reference in their entireties.

FIELD OF THE INVENTION

The present invention relates to a sensor element for detecting at least one property of a measuring gas in a measuring gas chamber.

BACKGROUND

A multitude of sensor elements and methods for detecting at least one property of a measuring gas in a measuring gas chamber are known from the related art. Fundamentally, this can concern any physical and/or chemical properties of the measuring gas, it being possible to detect one or multiple properties. The present invention is described below in particular with reference to a qualitative and/or quantitative detection of a proportion of a gas component of the measuring gas, in particular with reference to a detection of an oxygen proportion in the measuring gas portion. The oxygen proportion can be detected for example in the form of a partial pressure and/or in the form of a percentage. Alternatively or additionally, however, other properties of the measuring gas are detectable as well such as the temperature, for example.

Such sensor elements can be designed as so-called lambda probes, for example, as they are known for example from Konrad Reif (Ed.): Sensoren im Kraftfahrzeug (Sensors in the Motor Vehicle), 1st Edition 2010, p. 160-165. Using broadband lambda probes, in particular planar broadband lambda probes, it is possible for example to determine the oxygen concentration in the exhaust gas within a great range and thus infer the air-fuel ratio in the combustion chamber. The air ratio λ describes this air-fuel ratio.

Ceramic sensor elements are known in particular from the related art, which are based on the use of electrolytic properties of certain solids, that is, on ion-conducting properties of these solids.

These solids can be in particular ceramic solid electrolytes such as zirconium dioxide ($ZrO_2$) for example, in particular yttrium-stabilized zirconium dioxide (YSZ) and scandium-doped zirconium dioxide (ScSZ), which can contain small additions of aluminum oxide ($Al_2O_3$) and/or silicon oxide ($SiO_2$).

Despite the advantages of the sensor elements known from the related art, these still leave room for improvement. Thus ceramic exhaust-gas sensors are used for measuring the concentration of oxygen and/or nitrogens in the exhaust gases of automobiles. Following the start of the engine, the ceramic sensors are heated by integrated heaters within a few seconds to an operating temperature of about 700° C. to 800° C. The time until the operating temperature is reached, the so-called fast light-off time, depends greatly on the heating power produced by the heater. The fast light-off time is also reduced the more the heating energy is introduced locally in proximity of the Nernst electrodes since the temperature is determined here by internal resistance measurement. The maximum heating power that can be introduced in the heater is limited inter alia by the maximum amperage of the output stage in the engine control unit, the maximally admissible temperature in the heater meander without damaging the material and the maximally occurring thermomechanical stresses due to temperature differences within the ceramics without the formation and growth of fissures. The function of such a sensor element necessitates an inner electrode cavity. This cavity represents a heat barrier, which inhibits the heat conduction between the heating element and the outer pump electrode. The cavity side facing the heating element heats up more quickly during the heating process than the side facing away from the heating element. This gives rise to thermomechanical stresses especially on the outer edge of the cavity, which are additionally increased by the notch effect of the cavity edge.

SUMMARY

The present invention provides a sensor element for detecting at least one property of a measuring gas in a measuring gas chamber, which at least largely avoids the disadvantages of known sensor elements and which has in particular an improved heating behavior.

According to an example embodiment, a sensor element according to the present invention for detecting at least one property of a measuring gas in the measuring gas chamber, in particular for detecting a proportion of a gas component in the measuring gas or a temperature of the measuring gas, includes a ceramic layer construction having at least one electrochemical cell. The electrochemical cell has at least one first electrode, a second electrode, and at least one solid state electrolyte connecting the first electrode and the second electrode. An electrode cavity is developed in the layer construction. The second electrode is situated in the layer construction in such a way that the second electrode faces the electrode cavity or is exposed to it. The second electrode has at least one first outer diameter, which is greater than a first outer diameter of the electrode cavity.

By changing the cavity geometry, it is possible to widen a sealing frame surrounding the electrode cavity at the level of the electrode cavity. Widening the sealing frame markedly increases the heat transfer surface at a given total width of the sensor element. This results in a reduction of the temperature difference between the bottom side and the top side of the cavity and thus in reduced thermomechanical stresses. This reduction of the thermomechanical stresses allows for quicker heating at higher heating voltages. Because the outer diameter of the second electrode is greater than the outer diameter of the electrode cavity, a filling of the outer cavity edge with platinum is achieved, which reduces the notch stress in this area and allows for a plastic deformation prior to the ceramic fissure.

The electrode cavity can have an annular design. The term annular is to be understood as a contour that is closed in upon itself, which is not necessarily circular ring-shaped. The electrode cavity has at least two round electrode cavity sections that lie across from one another with a center point of the electrode cavity in between. The first outer diameter of the electrode cavity is defined by the two round electrode cavity sections. The second electrode can likewise have an annular design and have at least two round electrode cavity sections that lie across from one another with a center point of the second electrode in between. The first outer diameter of the second electrode can be defined by the two round electrode sections. The two round electrode cavity sections and the two round electrode sections can be situated in parallel to one another. For example, the respective sections are arranged in parallel one above the other. The two round electrode cavity sections can have identical radii. The two round electrode sections can have identical radii. The electrode cavity can have at least two straight electrode cavity sections that lie across from one another with a center point of the electrode cavity in between. A second outer diameter of the electrode cavity can be defined by the two straight electrode cavity sections. The second electrode can have at least two straight electrode sections that lie across from one another with a center point of the second electrode in between. A second outer diameter of the second electrode can be defined by the two straight electrode sections. The second outer diameter of the second electrode can be greater than the second outer diameter of the electrode cavity. The two straight electrode cavity sections and the two straight electrode sections can be situated in parallel to one another. The layer construction can have a terminal side, a front side, a top side, a bottom side, and two lateral surfaces, the lateral surfaces connecting the top side and the bottom side. The two straight electrode cavity sections and the two straight electrode sections can be situated in parallel to the lateral surfaces. The two round electrode cavity sections can have different radii. The two round electrode sections can have different radii. The electrode cavity can have at least two straight electrode cavity sections that lie across from one another with a center point of the electrode cavity in between. A second outer diameter of the electrode cavity can be defined by the two straight electrode cavity sections. The second electrode can have at least two electrode sections that lie across from one another with a center point of the second electrode in between. The two straight electrode cavity sections and the two straight electrode sections can be situated in parallel to one another. A second outer diameter of the second electrode can be defined by the two straight electrode sections. The second outer diameter of the second electrode can be greater than the second outer diameter of the electrode cavity. The layer construction can have a terminal side, a front side, a top side, a bottom side, and two lateral surfaces, the lateral surfaces connecting the top side and the bottom side. A first round electrode cavity section can be facing the front side and a second round electrode cavity section can be facing the terminal side. The first round electrode cavity section can have a greater radius than the second electrode cavity section. A first round electrode section can be facing the front side and a second round electrode section can be facing the terminal side. The first round electrode section can have a greater radius than the second electrode section.

Within the scope of the present invention, the term layer construction is to be understood generally as an element that have at least two layers and/or layer levels situated one on top of the other. The layers can be distinguishable due to the production of the layer structure and/or can be produced from different materials and/or initial substances. In particular, the layer construction can be designed completely or partially as a ceramic layer construction.

Within the scope of the present invention, a solid electrolyte layer is to be understood as a body or object having electrolytic properties, that is, having ion-conducting properties. In particular, this can be a ceramic solid electrolyte. This also comprises the raw material of a solid electrolyte and hence the development as a so-called green body or green compact, which becomes a solid electrolyte only after being sintered. In particular, the solid electrolyte can be developed as a solid electrolyte layer or from multiple solid electrolyte layers. Within the scope of the present invention, a layer is to be understood as a uniform mass in a planar extension of a certain height, which lies above, below, or between other elements.

Within the scope of the present invention, an electrode is to be understood generally as an element that is able to contact the solid electrolyte in such a way that a current can be maintained by the solid electrolyte and the electrode. Accordingly, the electrode can comprise an element, on which the ions can be incorporated into the solid electrolyte and/or removed from the solid electrolyte. The electrodes typically comprise a precious metal electrode, which can be applied on the solid electrolyte as a metal-ceramic electrode, for example, or be connected to the solid electrolyte in another manner. Typical electrode materials are platinum-cermet electrodes. Other precious metals, such as gold or palladium for example, can also be used, however.

Within the scope of the present invention, a heating element is to be understood as an element that is used to heat the solid electrolyte and the electrodes to at least their functioning temperature and preferably to their operating temperature. The functioning temperature is the temperature starting at which the solid electrolyte becomes conductive for ions and amounts to approximately 350° C. This is distinguished from the operating temperature, which is the temperature at which the sensor element is usually operated and which is higher than the functioning temperature. The operating temperature can range for example from 700° C. to 950° C. The heating element can comprise a heating area and at least one supply track. Within the scope of the present invention, a heating area is to be understood as the area of the heating element that overlaps with an electrode in the layer construction along a direction perpendicular to the surface of the sensor element. Normally, the heating area heats up more during operation than the supply track such that the two are distinguishable. The different heating can be achieved, for example, in that the heating area has a higher electrical resistance than the supply track. The heating area and/or the supply line are developed for example as electrical resistor tracks and heat up as a result of the application of an electric voltage. The heating element can be produced from a platinum cermet, for example.

Within the scope of the present invention, a thickness of a component or element is to be understood as a dimension in the direction of the layer construction and thus perpendicular with respect to the individual layer levels of the layer construction.

Within the scope of the present invention, an electrochemical cell is to be understood as an element that is selected from the group made up of pump cell and Nernst cell.

Within the scope of the present invention, an outer diameter of an electrode and of an electrode cavity is to be understood as an outer dimension of the electrode and of the electrode cavity perpendicular to an extension direction of the gas influx opening. This dimension is thus determined in parallel to the layers of the layer construction.

In comparison to conventional sensor elements, a basic idea of the present invention is the reduction of the size of the electrode cavity such that it is possible to increase the size of the sealing frame area. Widening the sealing frame increases the heat transfer surface at a given total width of the sensor element. This results in a reduction of the temperature difference between the bottom side and the top side of the electrode cavity and thus in reduced thermomechanical stresses. This reduction of the thermomechanical stresses allows for quicker heating at higher heating voltages.

Additional optional details and features of the present invention result from the following description of preferred exemplary embodiments, which are shown schematically in the figures.

DETAILED DESCRIPTION

Figure 1:
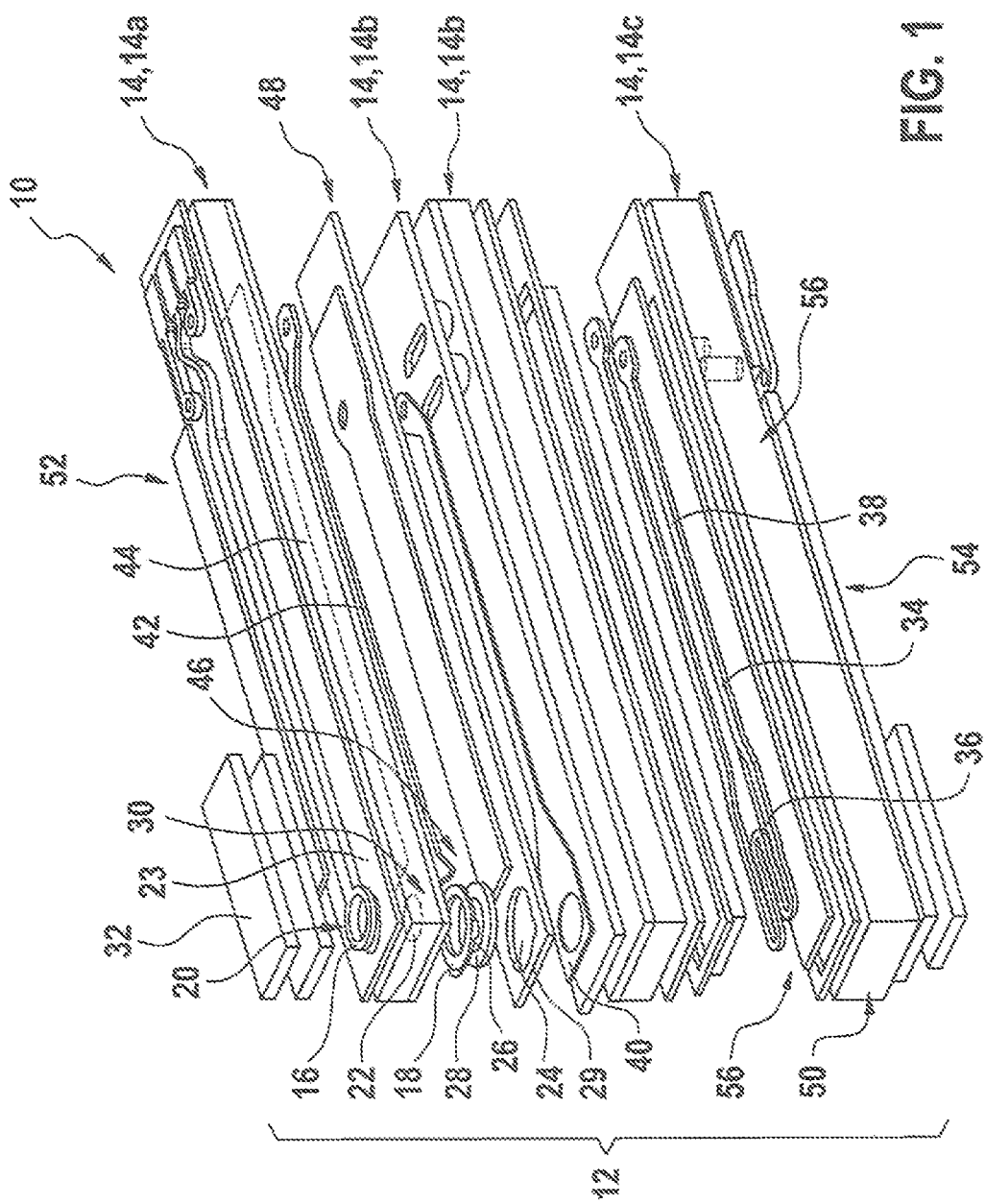
FIG. 1 an exploded view of a sensor element according to an example embodiment of the present invention.

The sensor element 10 shown in FIG. 1 can be used to detect physical and/or chemical properties of a measuring gas, it being possible to detect one or multiple properties. The present invention is described below in particular with reference to a qualitative and/or quantitative detection of a gas proportion of the measuring gas, in particular with reference to a detection of an oxygen proportion in the measuring gas. The oxygen proportion can be detected for example in the form of a partial pressure and/or in the form of a percentage. Fundamentally, however, other kinds of gas components are also detectable such as, for example, nitrogen oxides, hydrocarbons, and/or hydrogen. Alternatively or additionally, however, other properties of the measuring gas are detectable as well. The present invention can be used in particular in motor vehicle technology such that the measuring gas chamber can be in particular an exhaust tract of an internal combustion engine, and the measuring gas can be in particular an exhaust gas.

Sensor element 10 has a ceramic layer construction 12, which includes a solid electrolyte 14 and at least two electrodes 16, 18. Solid electrolyte 14 can be composed of several ceramic layers in the form of solid electrolyte layers or can includes multiple solid electrolyte layers. For example, solid electrolyte 14 includes a pump film or pump layer 14a, an intermediate film or intermediate layer 14b, and a heating film or heating layer 14c, which are situated one above or below the other and which will be described in more detail below. Electrodes 16, 18 are also designated as first electrode 16 and second electrode 18, without thereby indicating a weighting of their significance, however, but rather only to differentiate them terminologically. First electrode 16 and second electrode 18 are connected to each other, in particular electrically, by solid electrolyte 14 and in particular by pump layer 14a.

In addition, sensor element 10 has a gas influx path 20. Gas influx path 20 has a gas influx hole 22, which extends from a surface 23 of solid electrolyte 14 into the interior of layer construction 12. An electrode cavity 24 can be provided in solid electrolyte 14, which surrounds gas influx hole 22, for example annularly or rectangularly. Electrode cavity 24 is part of gas influx path 20 and can be connected to the measuring gas chamber via gas influx hole 22. Gas influx hole 22 extends for example as a cylindrical blind-end bore perpendicularly to surface 23 of solid electrolyte 14 into the interior of layer construction 12. In particular, electrode cavity 24 is designed to be essentially annular or rectangular and is bordered on three sides by solid electrolyte 14. A channel 26 is situated between gas influx hole 22 and electrode cavity 24, which is likewise part of gas influx path 20. In this channel 26, a diffusion barrier 28 is situated, which reduces or even prevents an after-flow of gas from the measuring gas chamber into electrode cavity 24 and allows only for a diffusion. Electrode cavity 24 is bounded by solid electrolyte 14 as well as by a sealing frame 29. Fundamentally, sealing frame 29 can be made of the same material as the solid electrolyte 14.

Layer construction 12 furthermore includes an electrochemical cell in the form of a pump cell 30. A limiting current of pump cell 30 can be set via this diffusion barrier 28. Pump cell 30 includes the first electrode 16 situated on surface 23 of solid electrolyte 14, which can annularly surround gas influx hole 22 and can be separated from the measuring gas chamber by a gas-permeable protective layer 32, for example. Pump cell 30 furthermore includes second electrode 18, which is situated in electrode cavity 24. Second electrode 18 can also be designed in annular fashion and can be situated in a rotationally symmetric manner around gas influx hole 22. For example, first electrode 16 and second electrode 18 are situated coaxially with respect to gas influx hole 22. The above-mentioned limiting current thus represents a current flow between first electrode 16 and second electrode 18 via solid electrolyte 14. A heating element 34 is situated in layer construction 12 in the elongation of the extension direction of the gas influx hole. Heating element 34 has a heating area 36 and electrical supply tracks 38. Heating area 36 is developed in meander-shaped fashion for example. Heating element 34 is situated between intermediate layer 14b and heating layer 14c. It is explicitly noted that heating element 34 is surrounded on both sides by a thin layer made of an electrically insulating material such as aluminum oxide, for example, even if this is not shown in detail in the figures. In other words, the thin layer made of the electrically insulating material is situated between intermediate layer 14b and heating element 34 as well as between heating element 34 and heating layer 14c. Since such a layer is known for example from the above-mentioned related art, it is not described here in more detail. For further details regarding the layer made of the electrically insulating material, reference is therefore made to the above-mentioned related art, the content of which, concerning the layer made of the electrically insulating material, is included herein by reference.

Furthermore, layer construction 12 can include a third electrode 40, a fourth electrode 42, and a reference gas channel 44. Reference gas channel 44 can extend perpendicularly to an extension direction of gas influx hole 22 into the interior of solid electrolyte 14. As mentioned above, gas influx hole 22 is designed to be cylindrical so that the extension direction of gas influx hole 22 runs parallel to a cylinder axis of gas influx hole 22. In this case, the reference gas channel 44 extends perpendicularly to the cylinder axis of gas influx hole 22. Reference gas channel 44 can extend in parallel to channel 26, for example. It is noted that reference gas channel 44 can also be located in an imaginary extension of gas influx hole 22 and thus further in the interior of solid electrolyte 14. It is not necessary for reference gas channel 44 to be designed as a macroscopic reference gas channel 44. Reference gas channel 44 can be designed as a so-called pumped reference, for example, that is, as an artificial reference.

The third electrode can be situated in electrode cavity 24. Third electrode 40 is situated opposite second electrode 18 for example. Fourth electrode 42 can be situated in reference gas channel 44. Third electrode 40, fourth electrode 42, and the part of solid electrolyte 14 between third electrode 40 and fourth electrode 42 form an electrochemical cell such as a Nernst cell 46, for example. Using pump cell 30, it is possible for example to set a pump current so that the condition lambda=1 or another known composition exists in electrode cavity 24. This composition in turn is detected by the Nernst cell in that a Nernst voltage is measured between the third electrode and the fourth electrode. Since a known gas composition exists in reference gas channel 44 or since this is exposed to an oxygen excess, it is possible to infer the composition in electrode cavity 24 from the measured voltage.

The layer construction thus designed has a terminal side 48, a front side 50, a top side 52, a bottom side 54, and two lateral surfaces 56 that connect the top side 52 and the bottom side 54.

Figure 2:
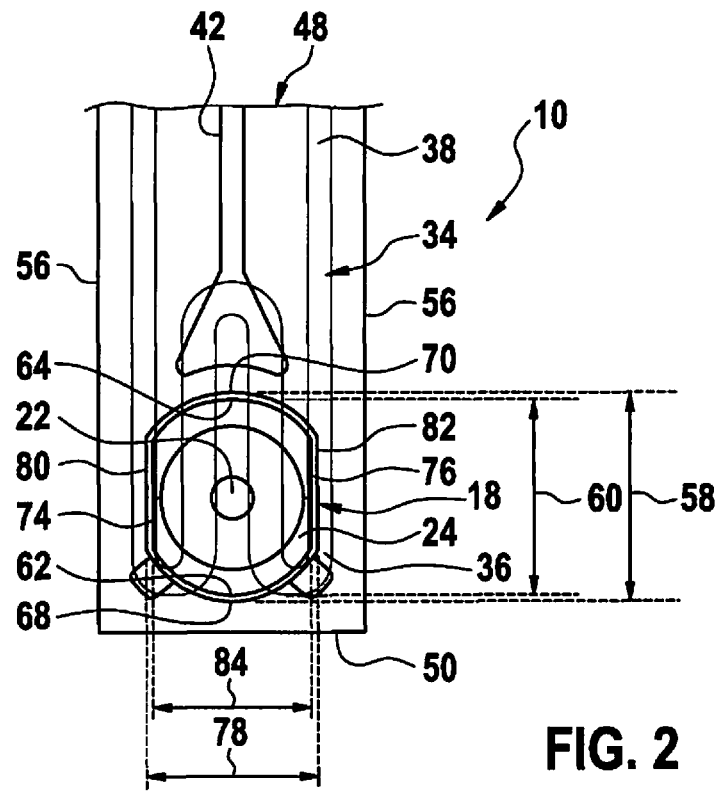
FIG. 2 is a longitudinal sectional view of a sensor element according to an example embodiment of the present invention.

FIG. 2 shows a longitudinal sectional view of a sensor element 10 according to a first example embodiment of the present invention. The positions of heating element 34, electrode cavity 24, second electrode 18, and fourth electrode 42 are indicated in this instance. The second electrode 18 has at least one first outer diameter 58, which is greater than a first outer diameter 60 of electrode cavity 24. Electrode cavity 24 is designed in annular fashion and has at least two round electrode cavity sections 62, 64, which are designated below as first round electrode cavity section 62 and second round electrode cavity section 64. The two round electrode cavity sections 62, 64 lie across from each other with a center point 66 of electrode cavity 24 in between. The first outer diameter 60 of electrode cavity 24 is defined by the two round electrode cavity sections 62, 64. Second electrode 18 is likewise designed in annular fashion and has at least two round electrode sections 68, 70, which are designated below as first round electrode section 68 and second round electrode section 70. The two round electrode sections 68, 70 lie across from each other with a center point 72 of second electrode 18 in between. First outer diameter 58 of second electrode 18 is defined by the two round electrode sections 68, 70. The two round electrode cavity sections 62, 64 and the two round electrode sections 68, 70 are situated in parallel to each other relative to the top view. The two round electrode cavity sections 62, 64 and the two first round electrode sections 68, 70 respectively have identical radii. First outer diameter 58 of second electrode 18 is 4,000 µm for example and first outer diameter 60 of electrode cavity 24 is 3,800 µm for example. This makes it clear that the electrode cavity 24 is designed to be smaller than in conventional sensor elements that have a circular ring-shaped design both of the electrode cavity as well as of the electrode situated within it. Thus, the outer diameter of the electrode cavity in conventional sensor elements 10 is normally 4,000 µm.

As can be seen further from FIG. 2, electrode cavity 24 has at least two straight electrode cavity sections 74, 76, which are situated across from one another with the center point 66 of electrode cavity 24 in between. The two straight electrode cavity sections 74, 76 define a second outer diameter 78 of electrode cavity 24. Second electrode 18 likewise has at least two straight electrode sections 80, 82 that lie across from each other with center point 72 of second electrode 18 in between. The two straight electrode sections 80, 82 define a second outer diameter 84 of second electrode 18. Second outer diameter 84 of second electrode 18 is greater than second outer diameter 78 of electrode cavity 24. The two straight electrode cavity sections 74, 76 and the two straight electrode sections 80, 82 are situated in parallel to each other. The two straight electrode cavity sections 74, 76 and the straight electrode sections 80, 82 are in particular situated in parallel to lateral surfaces 56. By reducing the size of electrode cavity 24 and providing the two straight electrode cavity sections 74, 76 parallel to lateral surfaces 56 in the sensor element 10 according to the present invention, it is possible to increase the width of sealing frame 29. The width of sealing frame 29 is a dimension perpendicular to lateral surfaces 56. Due to the enlargement of the outer diameter, second electrode 18 is partially situated on sealing frame 29.

Figure 3:
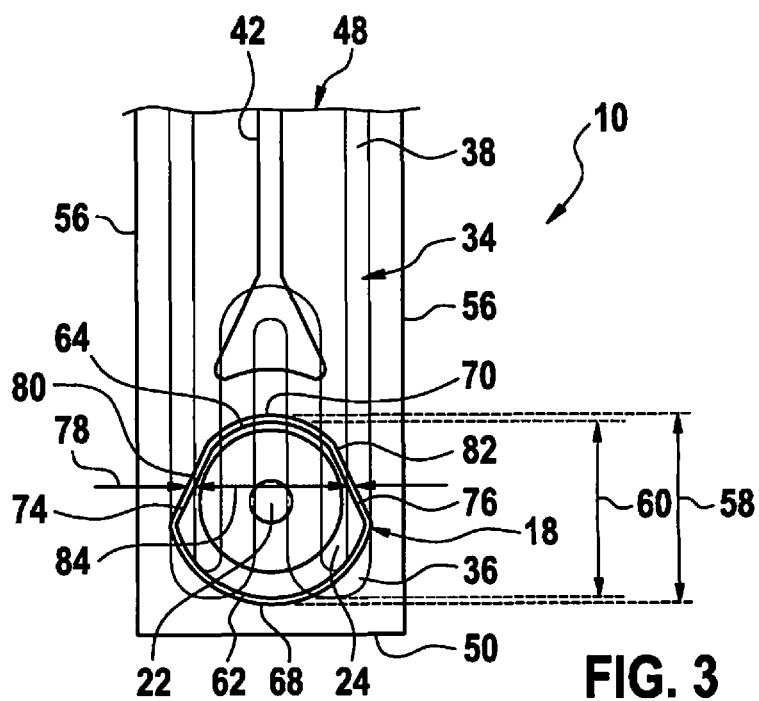
FIG. 3 is a longitudinal sectional view of a sensor element according to another example embodiment of the present invention.

FIG. 3 shows a longitudinal sectional view of a sensor element 10 according to a second example embodiment of the present invention. Below, only the differences from the previous example embodiment are described, and identical components are provided with the same reference numerals. The two round electrode cavity sections 62, 64 have different radii. Analogously, the two round electrode sections 68, 70 have different radii. Thus, the first round electrode cavity section 62, which faces front side 50, has a greater radius than second round electrode section 64, which faces terminal side 48. The first round electrode cavity section 62, for example, has a radius of 1,900 µm, whereas the second round electrode cavity section 64 has a radius of 1,600 µm. Analogously, the first round electrode section 68, which faces front side 50, has a greater radius than second round electrode section 70, which faces terminal side 48. The first round electrode section 68, for example, has a radius of 2,000 µm, whereas the second round electrode section 70 has a radius of 1,700 µm. The straight electrode cavity sections 74, 76 are not parallel to one another. Analogously, the straight electrode sections 80, 82 are not parallel to one another. However, the straight electrode cavity sections 74, 76 and the straight electrode sections 80, 82 are again parallel to one another. In other words, the straight electrode cavity section 74 and the straight electrode section 80 are parallel to each other. Moreover, the straight electrode cavity section 76 and the straight electrode section 82 are parallel to each other. Here too, second outer diameter 84 of second electrode 18 is greater than second outer diameter 78 of electrode cavity 24. In this instance, second outer diameters 78, 84 can be respectively an outer diameter perpendicular to lateral surfaces 56 that is averaged over the length of straight electrode cavity sections 74, 76 and straight electrode sections 80, 82, respectively.

What is claimed is:

1. A sensor element for detecting at least one property of a measuring gas in a measuring gas chamber, comprising:
   a ceramic layer construction that includes at least one electrochemical cell, the electrochemical cell including:
   a first electrode;
   a second electrode; and
   at least one solid electrolyte connecting the first electrode and the second electrode;
   wherein an electrode cavity is in the layer construction, wherein the second electrode faces the electrode cavity, and wherein a first outer diameter of the second electrode is greater than a first outer diameter of the electrode cavity;
   wherein the electrode cavity includes two round electrode cavity sections that are situated opposite each other with the electrode cavity between the two round electrode cavity sections, the first outer diameter of the electrode cavity is defined by the two round electrode cavity sections, and wherein the second electrode includes two round electrode sections that are situated opposite each other with the second electrode between the two round electrode sections, the first outer diameter of the second electrode being defined by the two round electrode sections; and wherein the electrode cavity has two straight electrode cavity sections situated opposite each other with the electrode cavity between the two straight electrode cavity sections, a second outer diameter of the electrode cavity being defined by the two straight electrode cavity sections, and wherein the second electrode has two straight electrode sections that are situated opposite each other with the second electrode between the two straight electrode sections, a second outer diameter of the second electrode being defined by the two straight electrode sections, the second outer diameter of the second electrode being greater than the second outer diameter of the electrode cavity.

2. The sensor element of claim 1, wherein the two round electrode cavity sections and the two round electrode sections are parallel to each other.

3. The sensor element of claim 1, wherein the two round electrode cavity sections have identical radii, and the two round electrode sections have identical radii.

4. The sensor element of claim 1, wherein the two straight electrode cavity sections and the two straight electrode sections are parallel to each other.

5. The sensor element of claim 4, wherein the layer construction includes a terminal side, a front side, a top side, a bottom side, and two lateral surfaces wherein the lateral surfaces connect the top side and the bottom side, and wherein the two straight electrode cavity sections and the two straight electrode sections are parallel to the lateral surfaces.

6. The sensor element of claim 1, wherein the two round electrode cavity sections have different radii, and the two round electrode sections have different radii.

7. The sensor element of claim 6, wherein:
the electrode cavity includes two straight electrode cavity sections situated opposite each other with the electrode cavity between the two straight electrode cavity sections;
a second outer diameter of the electrode cavity is defined by the two straight electrode cavity sections;
the second electrode includes two straight electrode sections that situated opposite each other with the second electrode between the two straight electrode sections;
the two straight electrode cavity sections and the two straight electrode sections are situated in parallel to each other; and
a second outer diameter of the second electrode is defined by the two straight electrode sections and is greater than the second outer diameter of the electrode cavity.

8. The sensor element of claim 6, wherein:
the layer construction includes a terminals side, a front side, a top side, a bottom side, and two lateral surfaces;
the lateral surfaces connect the top side and the bottom side;
a first round electrode cavity section faces the front side;
a second round electrode cavity section faces the terminal side;
the first round electrode cavity section has a greater radius than the second electrode cavity section;
a first round electrode section faces the front side;
a second round electrode section faces the terminal side; and
the first round electrode section has a greater radius than the second round electrode section.

9. The sensor element of claim 1, wherein the at least one property is a proportion of a gas component in the measuring gas.

10. The sensor element of claim 1, wherein the at least one property is a temperature of the measuring gas.

* * * * *